(12) United States Patent
Tomiyama

(10) Patent No.: US 9,382,989 B2
(45) Date of Patent: Jul. 5, 2016

(54) DYNAMIC DAMPER DEVICE AND LOCK-UP DEVICE FOR FLUID TYPE POWER TRANSMISSION DEVICE

(71) Applicant: EXEDY Corporation, Neyagawa-shi, Osaka (JP)

(72) Inventor: Naoki Tomiyama, Neyagawa (JP)

(73) Assignee: EXEDY Corporation, Osaka (JP)

( * ) Notice: Subject to any disclaimer, the term of this patent is extended or adjusted under 35 U.S.C. 154(b) by 148 days.

(21) Appl. No.: 14/368,856

(22) PCT Filed: Feb. 7, 2013

(86) PCT No.: PCT/JP2013/052804
§ 371 (c)(1),
(2) Date: Jun. 26, 2014

(87) PCT Pub. No.: WO2013/118802
PCT Pub. Date: Aug. 15, 2013

(65) Prior Publication Data
US 2014/0353105 A1   Dec. 4, 2014

(30) Foreign Application Priority Data

Feb. 7, 2012   (JP) ................................. 2012-023614

(51) Int. Cl.
*F16H 45/02* (2006.01)
*F16F 15/134* (2006.01)
*F16D 3/12* (2006.01)

(52) U.S. Cl.
CPC *F16H 45/02* (2013.01); *F16D 3/12* (2013.01); *F16F 15/134* (2013.01); *F16H 2045/0205* (2013.01); *F16H 2045/0221* (2013.01); *F16H 2045/0226* (2013.01); *F16H 2045/0278* (2013.01)

(58) Field of Classification Search
None
See application file for complete search history.

(56) References Cited

U.S. PATENT DOCUMENTS

| 4,412,606 A * | 11/1983 | Loizeau ............ F16F 15/1202 192/105 BB |
| 4,548,311 A * | 10/1985 | Lech, Jr. ............ F16F 15/1202 192/201 |
| 4,698,045 A * | 10/1987 | Billet .................. F16F 15/1202 192/105 BA |
| 5,713,442 A | 2/1998 | Murata et al. |
| 2011/0031083 A1 | 2/2011 | Matsuoka et al. |
| 2012/0080282 A1* | 4/2012 | Takikawa ................ F16H 45/02 192/3.28 |

FOREIGN PATENT DOCUMENTS

| JP | 09-264399 A | 10/1997 |
| JP | 2007-064345 A | 3/2007 |
| JP | 2007-225031 A | 9/2007 |
| JP | 2009-197889 A | 9/2009 |
| JP | 2009-293671 A | 12/2009 |
| JP | 2010-242891 A | 10/2010 |
| JP | 4932934 B2 | 5/2012 |

* cited by examiner

*Primary Examiner* — Ramya Burgess
*Assistant Examiner* — Timothy M Hannon
(74) *Attorney, Agent, or Firm* — Global IP Counselors, LLP

(57) ABSTRACT

A dynamic damper disposed between a piston of a lock-up device and a turbine hub of a fluid type power transmission device includes a pair of plates into which a torque is inputted and that is allowed to be coupled to the turbine hub, a hub flange, an inertia member fixed to the hub flange, a torsion spring, and a hysteresis torque generating mechanism. The hub flange is disposed between the pair of plates while being rotatable relative to the pair of plates. The torsion spring elastically couples the pair of plates and the hub flange. The hysteresis torque generating mechanism is disposed on an inner peripheral side of the hub flange while being disposed between the pair of plates, and is configured to generate a variable hysteresis torque between both plates and the hub flange.

6 Claims, 16 Drawing Sheets

DYNAMIC DAMPER DEVICE AND LOCK-UP DEVICE FOR FLUID TYPE POWER TRANSMISSION DEVICE

CROSS-REFERENCE TO RELATED APPLICATIONS

This application is a U.S. National stage application of International Application No. PCT/JP2013/052804, filed Feb. 7, 2013, which claims priority to Japanese Patent Application No. 2012-023614, filed in Japan on Feb. 7, 2012, the entire contents of which are hereby incorporated by reference.

BACKGROUND

1. Field of Invention

The present invention relates to a dynamic damper device, particularly to a dynamic damper device disposed between a piston of a lock-up device and a turbine hub of a fluid type power transmission device. Further, the present invention relates to a lock-up device, particularly to a lock-up device for mechanically transmitting power from a front cover to a turbine hub of a fluid type power transmission device.

2. Background Information

A torque converter as a fluid type power transmission device is embedded with a lock-up device to reduce fuel consumption. The lock-up device is disposed in a space produced between a turbine and a front cover, and is configured to mechanically couple the turbine and the front cover to directly transmit a torque therebetween.

In general, the lock-up device includes a piston and a damper mechanism. The piston is pressed onto the front cover by the action of hydraulic pressure, and a torque is transmitted to the piston from the front cover. The damper mechanism includes an output-side member coupled to the turbine, and a plurality of torsion springs for elastically coupling the piston and the output-side member. Moreover, the torque transmitted to the piston is transmitted to the output-side member through the plurality of torsion springs, and is further transmitted to the turbine.

Japanese Laid-open Patent Application Publication No. JP-A-2009-293671 describes a lock-up device in which an inertia member is mounted to the output-side member to inhibit variation in engine rotation. In the lock-up device described in Japanese Laid-open Patent Application Publication No. JP-A-2009-293671, the inertia member is mounted to the output member fixed to the turbine while being rotatable relative thereto. Further, torsion springs are disposed as elastic members between the output member and the inertia member.

In the lock-up device of Japanese Laid-open Patent Application Publication No. JP-A-2009-293671, the inertia member is coupled to the output member through the torsion springs. Therefore, the inertia member and the torsion springs function as a dynamic damper, and these components attenuate variation in rotational speed of the output-side member (turbine).

SUMMARY

Recent passenger vehicles have been demanded to suppress as low as possible a rotational speed at which the front cover and the turbine are coupled (hereinafter referred to as "a lock-up rotational speed") to enhance fuel consumption. However, in general, the engine rotational speed widely varies in a lower engine rotational speed range. Therefore, when the lock-up rotational speed is set to be low, the output-side rotational speed inevitably varies more widely. In view of this, with use of such lock-up device having the inertia member as described in Japanese Laid-open Patent Application No. JP-A-2009-293671, variation in rotation can be inhibited even when the lock-up rotational speed is set to be, for instance, roughly 1200 rpm.

However, a drawback is produced that the rotational speed widely varies at around 1600 rpm where the lock-up device having the inertia member is designed to have a specification of minimizing variation in output-side rotational speed at around 1200 rpm. The characteristic of variation in rotational speed, i.e., at around what rotational speed variation in rotational speed is minimized and maximized, is mainly attributed to the magnitude of a hysteresis torque to be produced between the output member and the inertia member.

The lock-up device described in Japanese Laid-open Patent Application No. JP-A-2009-293671 is embedded with a hysteresis torque generating mechanism, but variation in output-side rotational speed cannot be inhibited in a wide rotational speed range.

It is an object of the present invention to inhibit variation in output-side rotational speed in a wide rotational speed range even when the lock-up rotational speed is set to be low, and further, to implement such function without enlarging the device.

A dynamic damper device according to an aspect of the present invention is a device disposed between a piston of a lock-up device and a turbine hub of a fluid type power transmission device, and includes a pair of plates, an annular hub flange, an inertia member, an elastic member and a hysteresis torque generating mechanism. The pair of plates is a pair of members into which a torque is inputted from the piston and is allowed to be coupled to the turbine hub. The annular hub flange is disposed between the pair of plates while being rotatable relative to the pair of plates. The inertia member is fixed to the hub flange. The elastic member elastically couples the pair of plates and the hub flange in a rotational direction. The hysteresis torque generating mechanism is disposed on an inner peripheral side of the hub flange, while being disposed between the pair of plates in an axial direction, and is configured to generate a variable hysteresis torque between the pair of plates and the hub flange.

In the present device, a torque is inputted into the pair of plates through the piston, and is outputted to the turbine hub to which the pair of plates is coupled. The hub flange, to which the inertia member is fixed, is disposed between the pair of plates through the elastic member. Variation in rotational speed is inhibited by the inertia member.

The pair of plates and the hub flange are rotated relative to each other, and a hysteresis torque generated by the hysteresis torque generating mechanism acts between the both members. A characteristic of variation in output-side rotational speed varies depending on the magnitude of a hysteresis torque.

In view of the above, according to the present invention, a hysteresis torque is configured to vary depending on rotational speed ranges, and variation in output-side rotational speed is configured to be reduced in a wide rotational speed range. Therefore, even when the lock-up rotational speed is set to be low, variation in rotational speed can be inhibited in a wide rotational speed range.

Further, the hysteresis torque generating mechanism is disposed on the inner peripheral side of the hub flange, while being disposed axially between the pair of plates. Therefore, it is possible to prevent a situation that the axial size of the device is inevitably increased due to the hysteresis torque generating mechanism provided therein. Yet further, the hysteresis torque generating mechanism can be composed of a small number of components. Thus, cost reduction can be implemented.

Preferably, the hysteresis torque generating mechanism is configured to generate a first hysteresis torque in a low rotational speed range and generate a second hysteresis torque greater than the first hysteresis torque in middle to high rotational speed ranges.

When a small hysteresis torque is generated between the pair of plates and the hub flange, variation in output-side rotational speed is reduced in the low rotational speed range. Contrarily to this, when a large hysteresis torque is generated therebetween, variation in output-side rotational speed is reduced in the middle rotational speed range. In view of the above, according to the present invention, the first hysteresis torque is configured to be generated in the low rotational speed range, whereas the greater second hysteresis torque is configured to be generated in the middle to high rotational speed ranges. Therefore, variation in engine-side rotational speed can be inhibited in a wide rotational speed range.

Preferably, the hysteresis torque generating mechanism includes a plurality of sliders configured to be rotated together with the pair of plates and be movable in a radial direction, and the plurality of sliders are configured to be moved radially outward by means of a centrifugal force to be contacted to an inner peripheral surface of the hub flange when the pair of plates is rotated at a predetermined rotational speed or greater.

A hysteresis torque, configured to vary depending on the rotational speed, can be generated by utilizing the centrifugal force acting on the sliders. Therefore, the hysteresis torque generating mechanism can be implemented with a simple structure.

Preferably, the hysteresis torque generating mechanism further includes a pressing mechanism configured to press the plurality of sliders onto at least either of the pair of plates, and is configured to strongly press each of the sliders onto the inner peripheral surface of the hub flange by an action using a principle of lever where the part of each slider pressed onto either of the pair of plates by the pressing mechanism serves as a fulcrum.

To generate a large hysteresis torque, the sliders are required to be enlarged for increasing the centrifugal force thereof. However, a large occupied space is required for the purpose. By contrast, when the sliders are reduced for the purpose of compactness, the centrifugal force acting on the reduced sliders is also reduced. Thus, a large hysteresis torque cannot be generated.

In view of the above, according to the present invention, the pressing mechanism for pressing the sliders onto at least either of the plates is further provided, and it is configured that a large hysteresis torque can be generated even with small sliders by utilizing the principle of lever.

Preferably, the pressing mechanism includes a contact part and a support part. The contact part is formed on at least either of the pair of plates, and is disposed away from a rotation-directional lateral surface of each of the sliders through a clearance. The support part supports each of the sliders to make each of the sliders pivotable with respect to the turbine in the rotational direction.

In the present device, when being contacted to the hub flange by means of the centrifugal force, the sliders attempt to rotate together with the hub flange. Thus, each slider pivots about the support part. With the pivot of each slider, a lateral surface of each slider is contacted to the contact part of the relevant plate.

Here, the sliders can be strongly pressed onto at least either of the pair of plates with a simple structure, and a large hysteresis torque can be easily generated.

A lock-up device for a fluid type power transmission device according to another aspect of the present invention is a device configured to mechanically transmit a power from a front cover to a turbine hub of the fluid type power transmission device, and includes: a piston configured to be pressed onto the front cover; the dynamic damper device recited in any of the aforementioned inventions; and an elastic member elastically coupling the piston and the dynamic damper device in the rotational direction.

According to the present invention as described above, in a lock-up device, the lock-up rotational speed can be set to be as low as possible, and in addition, variation in turbine rotation can be inhibited in a wide rotational speed range. Therefore, low fuel consumption can be achieved. Further, a mechanism for generating a variable hysteresis torque can be implemented with a simple structure without increasing the axial size of the device.

DESCRIPTION OF THE EXEMPLARY EMBODIMENTS

Entire Structure

Figure 1:
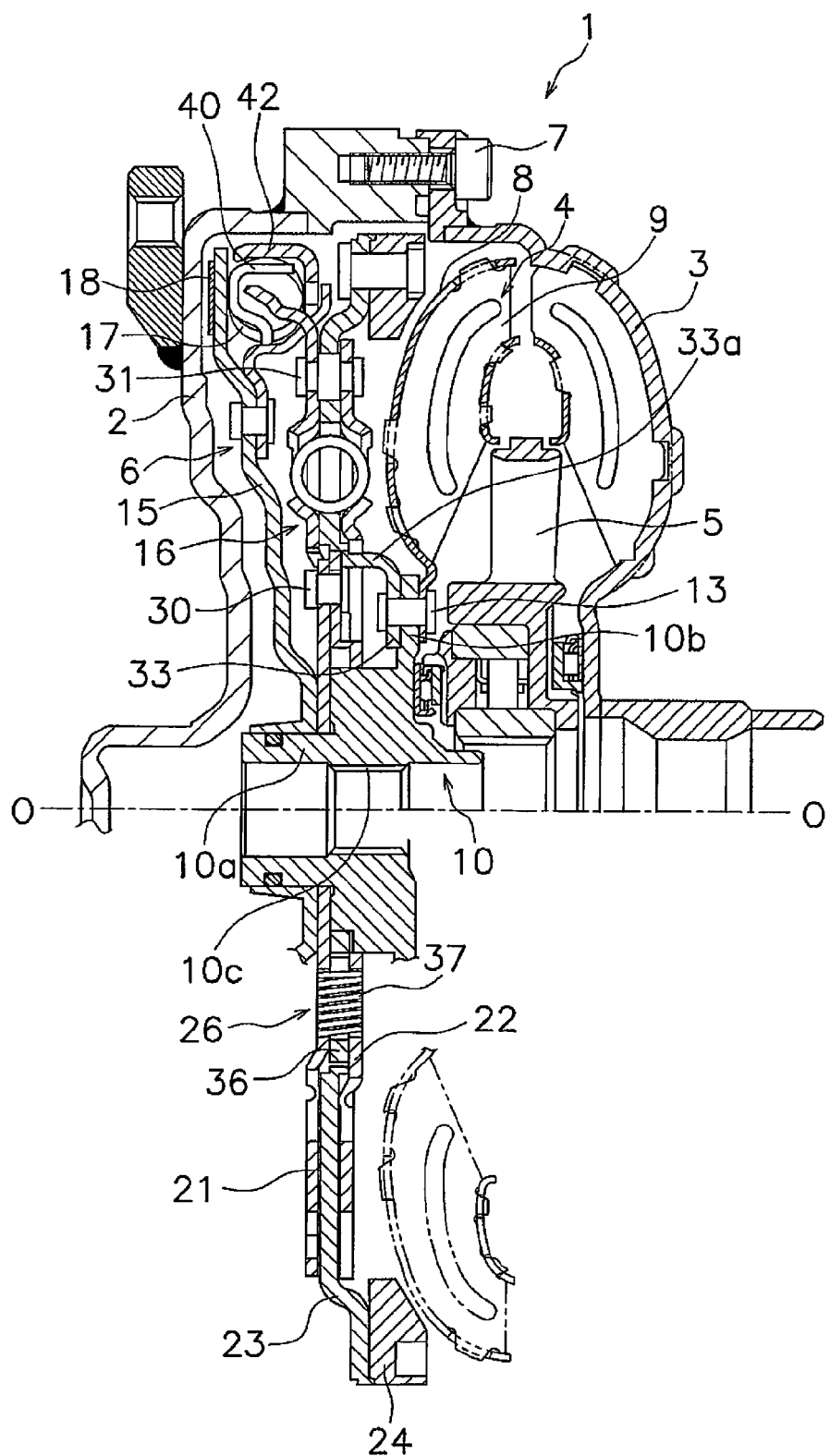
FIG. 1 is a cross-sectional structural view of a torque converter equipped with a lock-up device according to an exemplary embodiment of the present invention.

FIG. 1 illustrates a torque converter as a fluid type power transmission device according to an exemplary embodiment of the present invention. In FIG. 1, an engine is disposed on the left side, whereas a transmission is disposed on the right side. A line O-O depicted in FIG. 1 is a rotary axis line of the torque converter. It should be noted that a main body of the torque converter is illustrated while a part thereof is not illustrated.

A torque converter 1 is a device for transmitting power from a crankshaft of the engine to an input shaft of the transmission. The torque converter 1 mainly includes a front cover 2 into which power is inputted, an impeller 3, a turbine 4, a stator 5 and a lock-up device 6.

The outer peripheral part of the front cover 2 and that of the impeller 3 are fixed to each other by bolts 7. The front cover 2 and the impeller 3 form a fluid chamber. The turbine 4 is disposed in opposition to the impeller 3 within the fluid chamber. The turbine 4 includes a turbine shell 8, a plurality of turbine blades 9 fixed to the inside of the turbine shell 8, and a turbine hub 10 fixed to the inner peripheral part of the turbine shell 8. The turbine hub 10 has a tubular part 10a extending in the axial direction, and a disc-shaped flange 10b extending radially outward from the tubular part 10a. Further, the inner peripheral part of the turbine shell 8 is fixed to the outer peripheral part of the flange 10b by rivets 13. It should be noted that a spline hole 10c is formed in the inner peripheral part of the turbine hub 10. Further, the input shaft of the transmission (not illustrated in the drawings) is coupled to the spline hole 10c. On the other hand, the stator 5 is a mechanism for regulating the flow of operating oil from the turbine 4 to the impeller 3. The stator 5 is disposed between the impeller 3 and the turbine 4.

Lock-up Device 6

Figure 2:
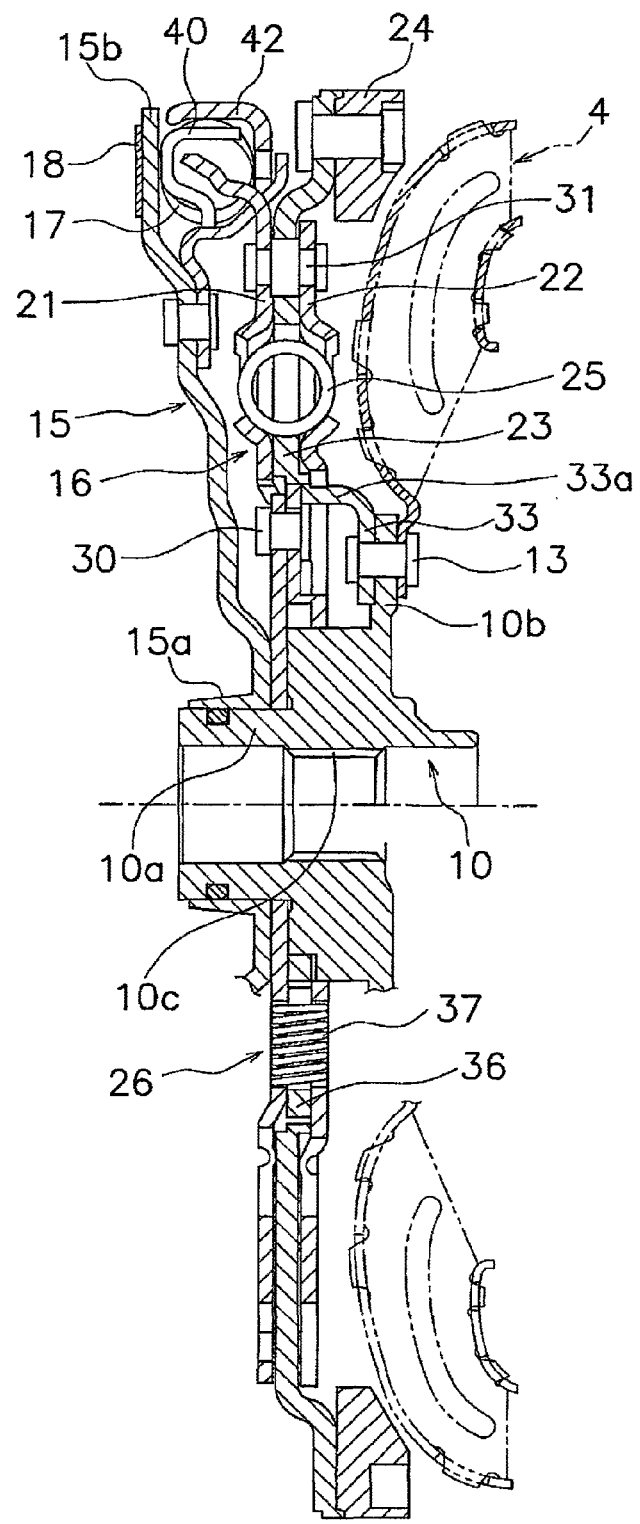
FIG. 2 is a cross-sectional structural view of the lock-up device.

FIG. 2 illustrates the lock-up device 6 taken out from the torque converter 1. The lock-up device 6 is a device for mechanically coupling the front cover 2 and the turbine 4 when the engine rotational speed reaches a predetermined rotational speed (the lock-up rotational speed). As illus1trated in FIG. 1, the lock-up device 6 is disposed between the front cover 2 and the turbine 4. The lock-up device 6 includes a piston 15, a dynamic damper device 16 and a plurality of first torsion springs 17.

Piston 15

The piston 15 has a tubular part 15a on the inner peripheral part thereof, and the tubular part 15a is formed by bending the inner peripheral part toward the engine. Further, the tubular part 15a is supported by the outer peripheral surface of the tubular part 10a of the turbine hub 10 while being slidable in the axial direction and the rotational direction. Yet further, an annular friction member 18, configured to be pressed onto the lateral surface of the front cover 2, is fixed to an outer peripheral part 15b of the piston 15.

Dynamic Damper Device 16

The dynamic damper device 16 includes a pair of a first plate 21 and a second plate 22, a hub flange 23, an inertia member 24, a plurality of second torsion springs 25, and a hysteresis torque generating mechanism 26.

First and Second Plates 21 and 22

Figure 3:
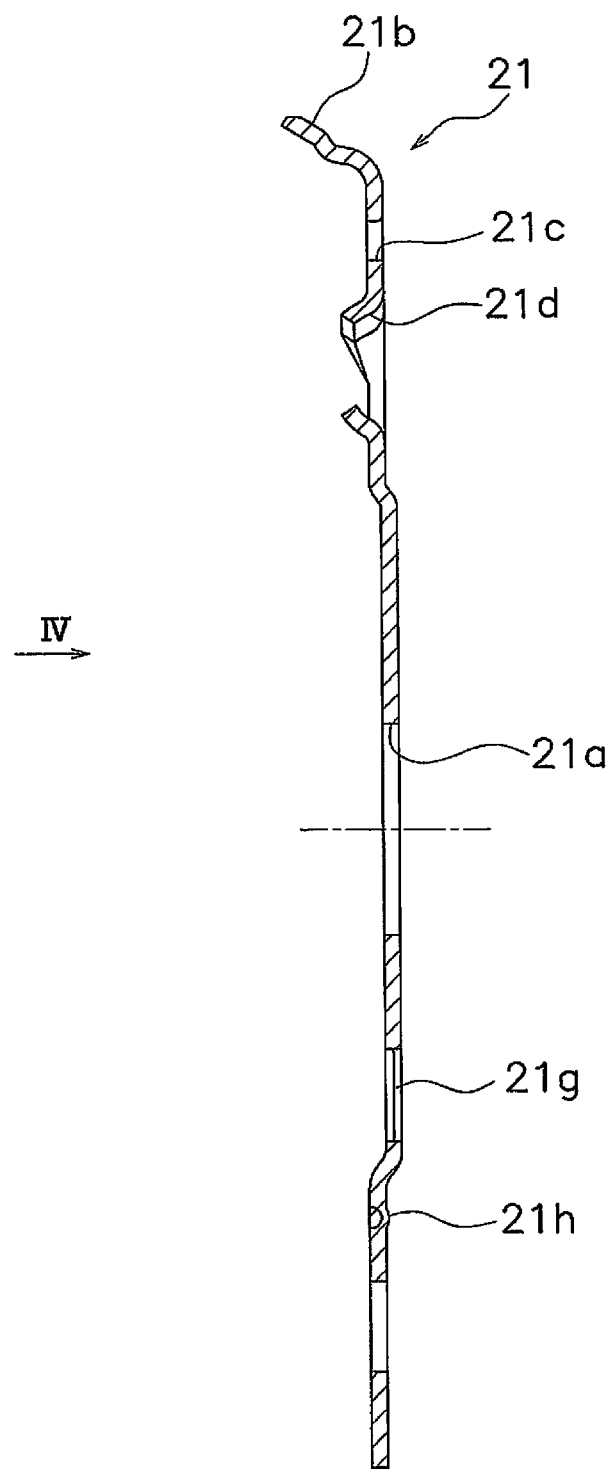
FIG. 3 is a cross-sectional view of a first plate.
Figure 4:
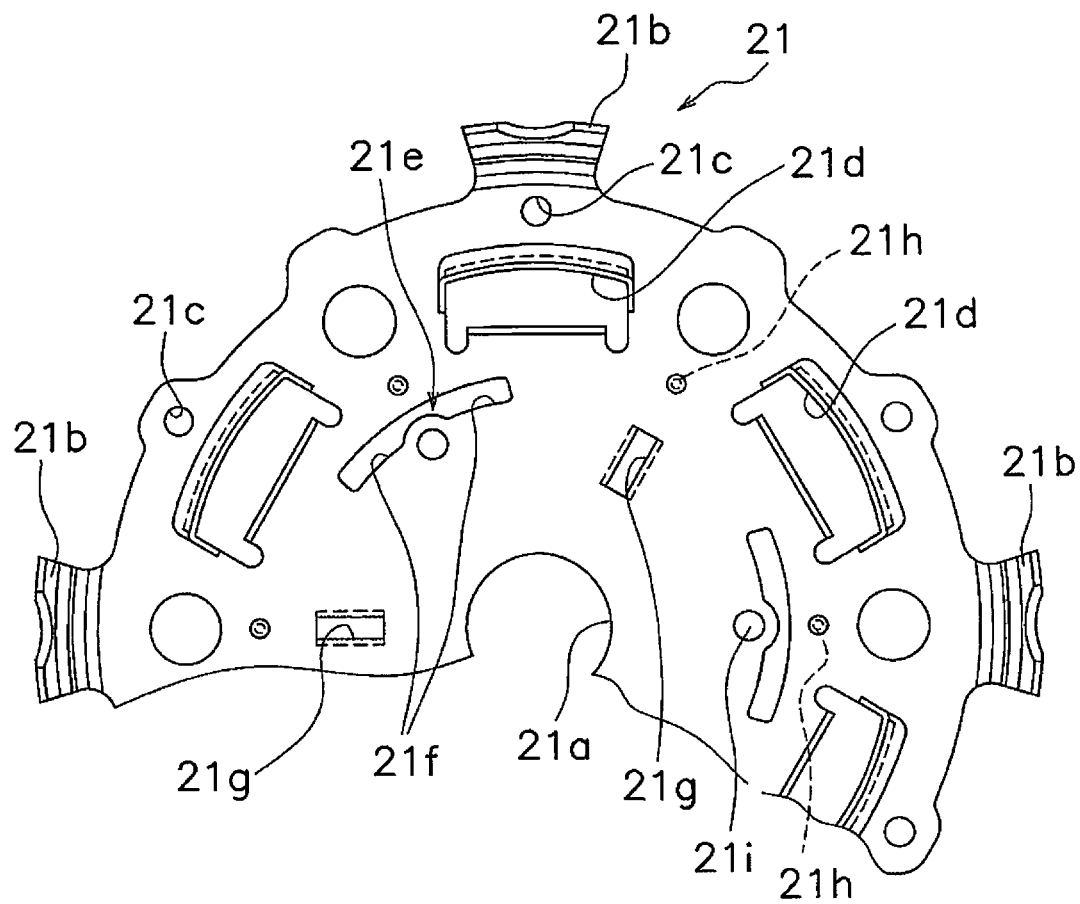
FIG. 4 is a partial view of FIG. 3 seen in an arrow IV direction.

FIG. 3 illustrates a cross-sectional view of the first plate 21, whereas FIG. 4 illustrates a part of FIG. 3 seen in a direction IV As illustrated in these drawings, the first plate 21 is a disc-shaped member and has a circular aperture 21 bored in the center part thereof, and four engaging protrusions 21b formed on the outer peripheral part thereof. The four engaging protrusions 21b are formed to protrude to the outer peripheral side and slant toward the engine. The plural first torsion springs 17 are disposed among these engaging protrusions 21b. The circumferential end surfaces of the four engaging protrusions 21b can be engaged with the circumferential end parts of the first torsion springs 17.

Further, the first plate 21 has six stop pin apertures 21c formed on the inner peripheral side of the engaging protrusions 21b, and six accommodation parts 21d formed on the further inner peripheral side of the stop pin apertures 21c to accommodate the second torsion springs 25. Three circular-arc openings 21e are bored and located on the inner peripheral side of the accommodation parts 21d. Each of the three openings 21e has engaging recesses 21f that are formed on the both ends thereof to dent to the inner peripheral side. Further, three spring-holding openings 21g are bored among the three openings 21e in the circumferential direction.

Figure 5:
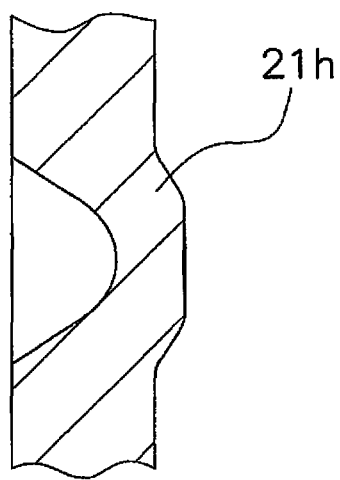
FIG. 5 is an enlarged view of a convex part of the first plate.

Circular convex parts 21h are formed on the outer peripheral side of the three openings 21e and the three spring-holding openings 21g to protrude toward the second plate 22. As illustrated in an enlarged view of FIG. 5, each convex part 21h is formed by extruding a part of the first plate 21 toward the second plate 22. The tip end of each convex part 21h is made in the form of a flat surface, and protrudes from the surrounding surface thereof toward the second plate 22 by a predetermined distance. The tip end surface is contacted to the lateral surface of the hub flange 23.

Rivet apertures 21i are respectively bored and located on the inner peripheral side of the three openings 21e.

Figure 6:
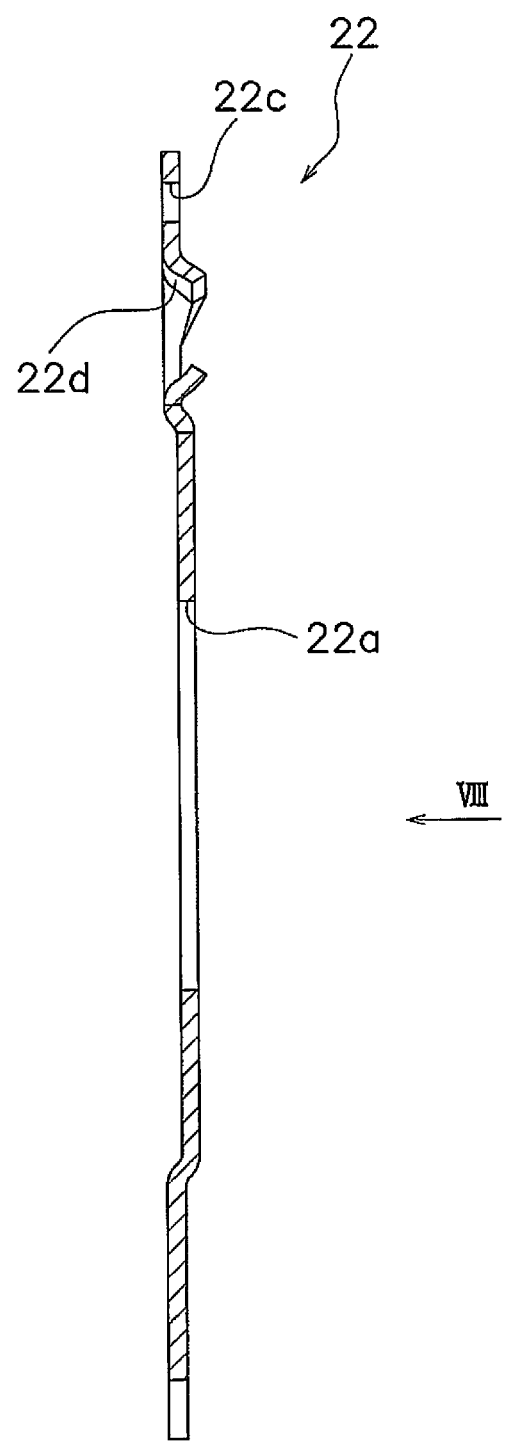
FIG. 6 is a cross-sectional view of a second plate taken along a line VI-VI in FIG. 8.
Figure 7:
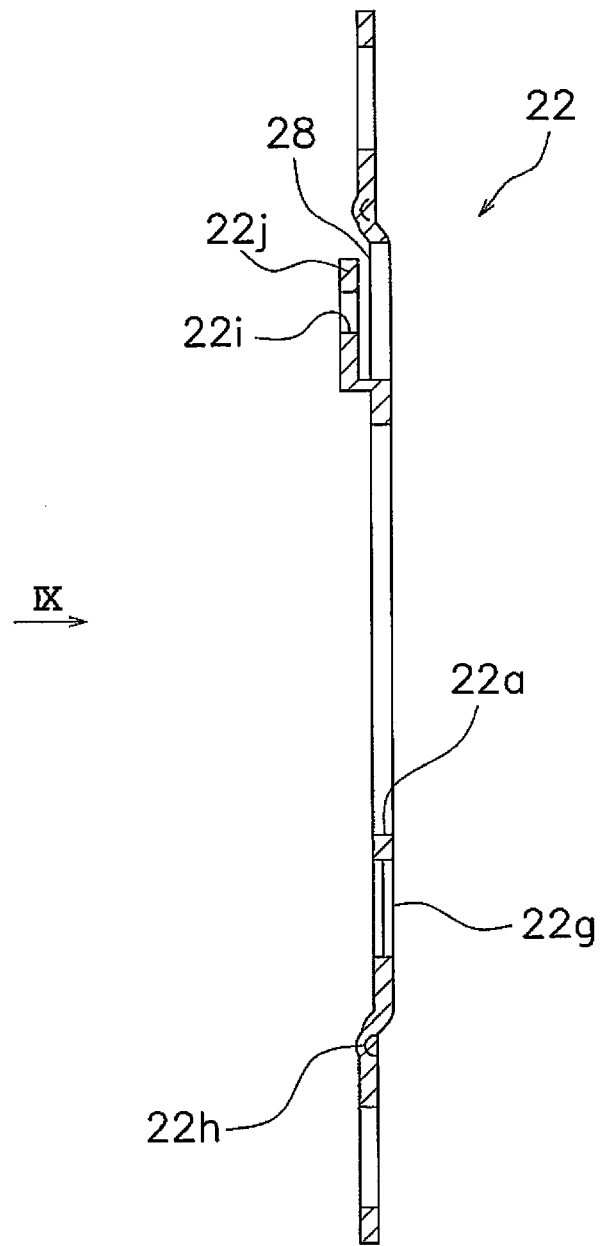
FIG. 7 is another cross-sectional view of the second plate taken along a line VII-VII in FIG. 8.
Figure 8:
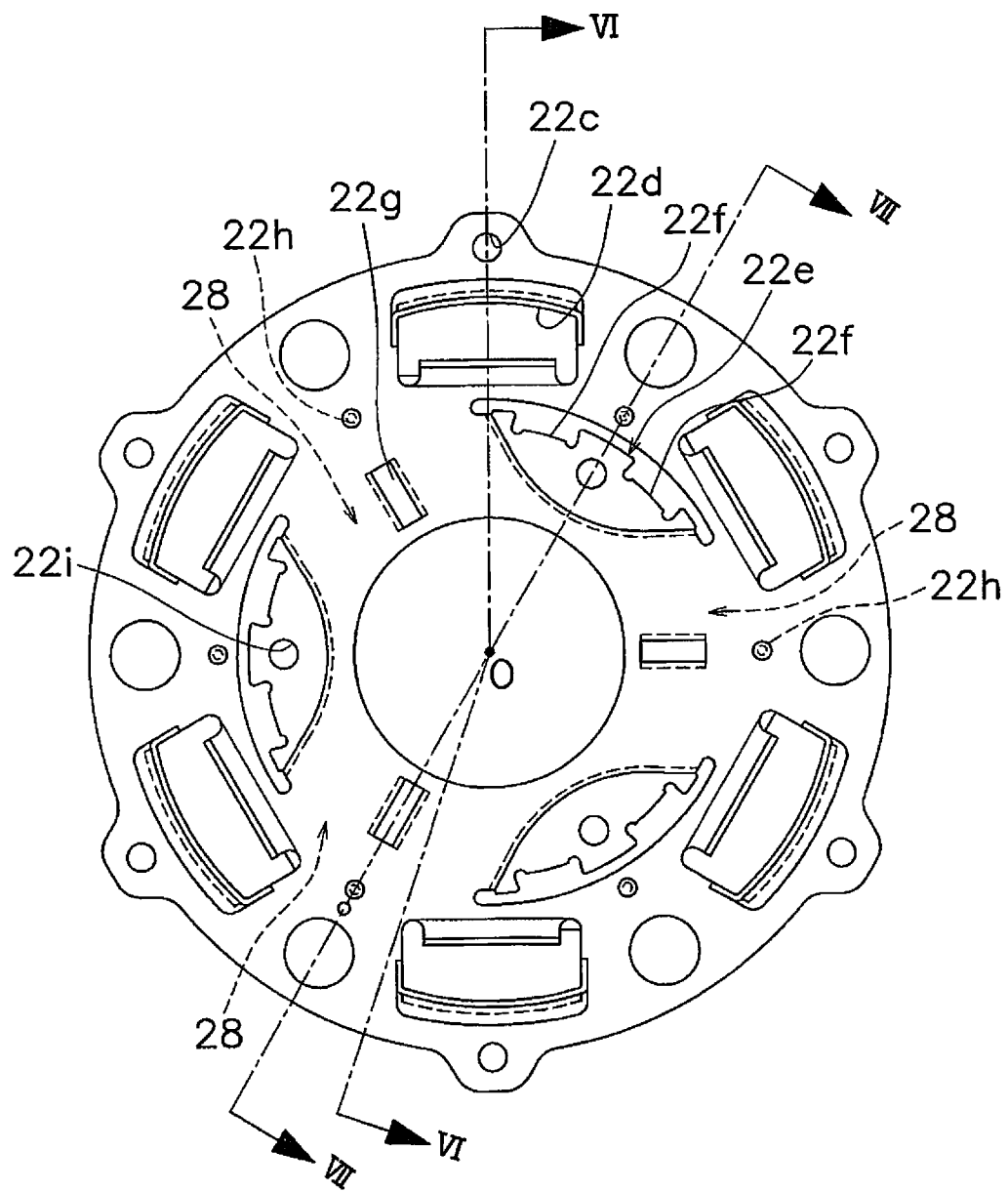
FIG. 8 is a view of FIG. 6 seen in a direction VIII.
Figure 9:
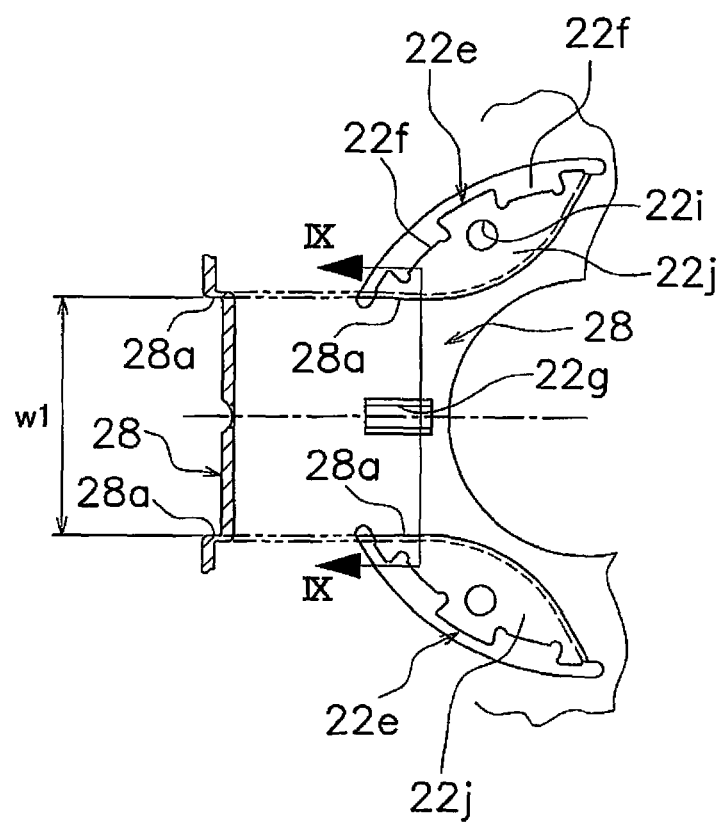
FIG. 9 is a view of FIG. 7 seen in a direction IX.

FIGS. 6 and 7 illustrate cross-sectional views of the second plate 22, whereas FIG. 8 illustrates a front view of the second plate 22. FIG. 9 illustrates a part of FIG. 7 seen in a direction IX and a cross-sectional view of the part taken along a line IX-IX. FIG. 6 is a cross-sectional view of FIG. 8 taken along a line VI-VI, whereas FIG. 7 is a cross-sectional view of FIG. 8 taken along a line VII-VII.

As illustrated in these drawings, the second plate 22 is a disc-shaped member and has a circular aperture 22a bored in the center part thereof, six stop pin apertures 22c bored in the outer peripheral part thereof, and six accommodation parts 22d formed on the further inner peripheral side of the stop pin apertures 22c to accommodate the second torsion springs 25. Three circular-arc openings 22e are bored and located on the inner peripheral side of the accommodation parts 22d. Each of the three openings 22e has engaging recesses 22f that are formed on the both ends thereof to dent to the inner peripheral side. Further, three spring-holding openings 22g are bored among the three openings 22e in the circumferential direction.

Circular convex parts 22h are formed on the outer peripheral side of the three openings 22e and the three spring-holding openings 22g to protrude toward the first plate 21. Each convex part 22h is formed similarly to each convex part 21h formed on the first plate 21.

Rivet apertures 22i are respectively bored and located on the inner peripheral side of the three openings 22e.

Further, the second plate 22 has slider support portions 28 formed in three positions on the inner peripheral side of the accommodation parts 22d. The slider support portions 28 compose a part of the hysteresis torque generating mechanism 26, and support sliders (to be described) in a radially movable state. As illustrated in FIGS. 7 and 9, the respective slider support portions 28 are formed among the three openings 22e. When described in detail, the inner peripheral parts of the three openings 22e are formed as offset parts 22j that are extruded toward the first plate 21 while being convexly curved to the inner peripheral side in a circular-arc shape. Further, the slider support portions 28 are formed among the three offset parts 22j in the circumferential direction. As illustrated in FIG. 9, each slider support portion 28 is formed about the spring-holding opening 22g in the circumferential direction of both sides and with a width W1. Further, the circumferential ends thereof serve as contact parts 28a configured to collide with each slider to be described.

As illustrated in FIGS. 1 and 2, the first plate 21 and the second plate 22, structured as described above, are fixed to each other by rivets 30 penetrating through the rivet apertures 21i and 22i of the respective plates 21 and 22, while the inner peripheral part of the first plate 21 and offset parts 22j of the second plate 22 are contacted to each other. Further, the outer peripheral parts of the both plates 21 and 22 are fixed by stop pins 31 penetrating through the stop pin apertures 21c and 22c of the respective plates 21 and 22, while being axially separated at a predetermined clearance. Both plates 21 and 22, except for the parts thereof fixed to each other by the rivets 30, are disposed in opposition to each other through the predetermined clearance set by the stop pins 31.

As illustrated in FIGS. 1 and 2, a driven plate 33 is fixed to the flange 10b of the turbine hub 10 by the rivets 13. This driven plate 33 is formed in an annular shape, and has a plurality of pawls 33a that are formed on the outer peripheral end thereof to bend and extend toward the engine. Further, the plural pawls 33a are engaged with the engaging recesses 21f of the first plate 21 and the engaging recesses 22f of the second plate 22. Therefore, the first and second plates 21 and 22 are rotated in synchronization with the turbine hub 10.

Further, the second torsion springs 25 are accommodated within the accommodation parts 21d and 22d of the both plates 21 and 22.

Hub Flange 23 and Inertia Member 24

Figure 10:
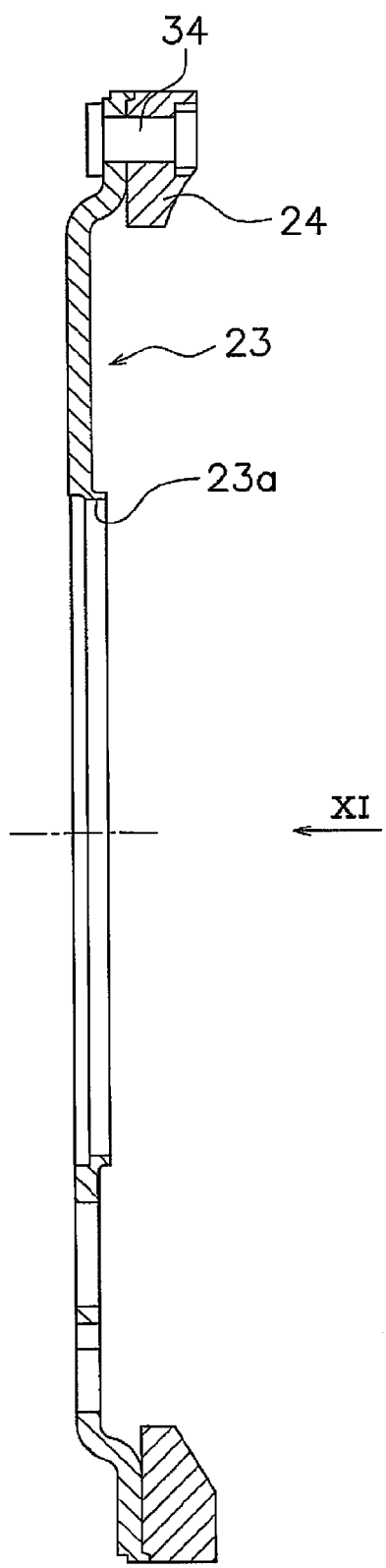
FIG. 10 is a cross-sectional view of a hub flange and an inertia member.
Figure 11:
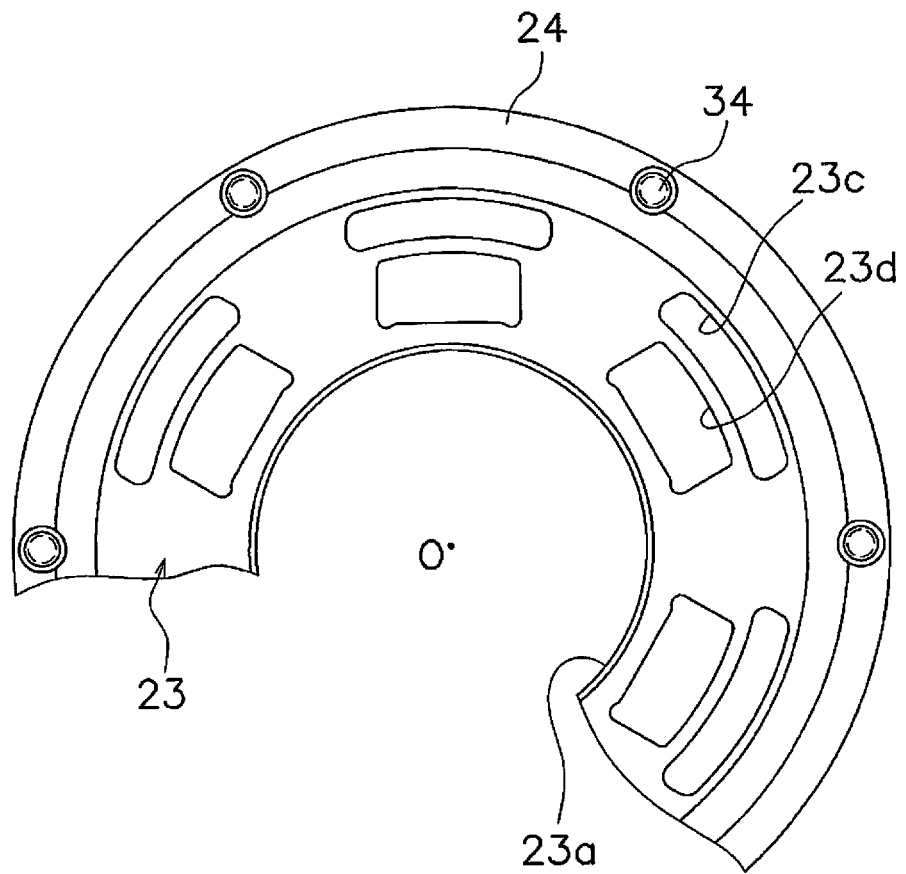
FIG. 11 is a partial view of FIG. 10 seen in a direction XI.

As illustrated in FIG. 10 and FIG. 11, which is a view of FIG. 10 seen in a direction XI, the hub flange 23 is a disc-shaped member having an aperture 23a in the center part thereof. The annular inertia member 24 is fixed to the outer peripheral end of the hub flange 23 by rivets 34. Further, six circular-arc elongated apertures 23c are bored and located on the inner peripheral side of a part, on which the inertia member 24 is mounted, of the hub flange 23, and six accommodation parts 23d are formed on the further inner peripheral side of the elongated apertures 23c. The trunk parts of the stop pins 31 penetrate through the elongated apertures 23c. Thus, the hub flange 23 is rotatable relatively to the first and second plates 21 and 22 within an angular range in which each elongated aperture 23c is formed. Further, the respective accommodation parts 23d are formed in the same positions as the accommodation parts 21d and 22d of the both plates 21 and 22. The second torsion springs 25 are accommodated in the accommodation parts 23d.

As described above, the convex parts 21h and 22h are formed on the first and second plates 21 and 22, and are contacted to the both lateral surfaces of the hub flange 23. Therefore, a clearance corresponding to the height of the respective convex parts 21h is produced between one lateral surface of the hub flange 23 and the first plate 21 except for the positions on which the convex parts 21h are formed, whereas a clearance corresponding to the height of the respective convex parts 22h is produced between the other lateral surface of the hub flange 23 and the second plate 22 except for the positions in which the convex parts 22h are formed.

Hysteresis Torque Generating Mechanism 26

The hysteresis torque generating mechanism 26 is disposed between the first plate 21 and the second plate 22 in the axial direction, while being disposed on the inner peripheral side of the hub flange 23 in the radial direction. The hysteresis torque generating mechanism 26 is configured to generate a variable hysteresis torque between the first and second plates 21 and 22 and the hub flange 23.

Figure 12:
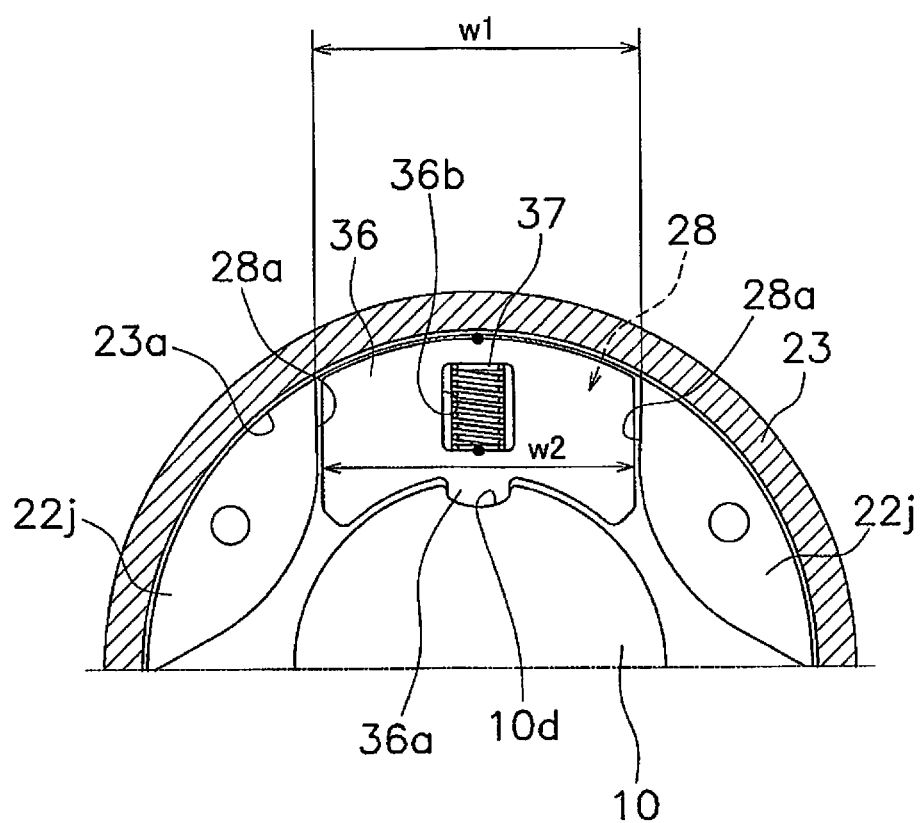
FIG. 12 is a schematic view of a hysteresis torque generating mechanism.

FIG. 12 schematically illustrates a basic structure of the hysteresis torque generating mechanism 26. It should be noted that FIG. 12 is a schematic diagram, and therefore, some of the respective members illustrated in FIG. 12 may have dimensions, shapes and so forth different from those of their relevant members illustrated in the other drawings.

The hysteresis torque generating mechanism 26 includes the slider support portions 28 formed in the aforementioned second plate 22, three sliders 36 respectively disposed in the slider support portions 28 while being radially movable, and springs 37 respectively disposed correspondingly to the sliders 36.

Each slider 36 is disposed between the two contact parts 28a formed on both ends of each slider support portion 28. The outer peripheral part of each slider 36 is formed in a circular-arc shape, and is contactable to the inner peripheral surface (the surface of the aperture 23a, hereinafter referred to as "an inner peripheral end surface") of the hub flange 23. The inner peripheral part of each slider 36 is formed in a shape along the outer peripheral surface of the turbine hub 10, and has a support protrusion 36a that is formed on the circumferential middle part thereof to protrude to the inner peripheral side. Further, an opening 36b for accommodating each spring 37 is formed on the outer peripheral side of each support protrusion 36a, while being located in a position corresponding to its relevant pair of the spring-holding openings 21g and 22g of the first and second plates 21 and 22.

A plurality of circular-arc support recesses 10d are formed on the outer peripheral surface of the turbine hub 10. Further, the plural support recesses 10d support the support protrusions 36a of the sliders 36. Here, as illustrated in FIGS. 9 and 12, the width between the contact parts 28a formed on both ends of each slider support portion 28 is W1, whereas the width of each slider 36 is W2, which is less than W1. Clearances are produced between both lateral surfaces of each slider 36 and the contact parts 28a opposed thereto. Thus, each slider 36 is radially movable, while being pivotable about the support protrusion 36a in a range of the clearance.

The support protrusions 36a of the sliders 36 and the contact parts 28a of the slider support portions 28, as described above, compose a pressing mechanism for pressing the sliders 36 onto a part of the second plate 22 (i.e., the contact parts 28a).

Figure 13:
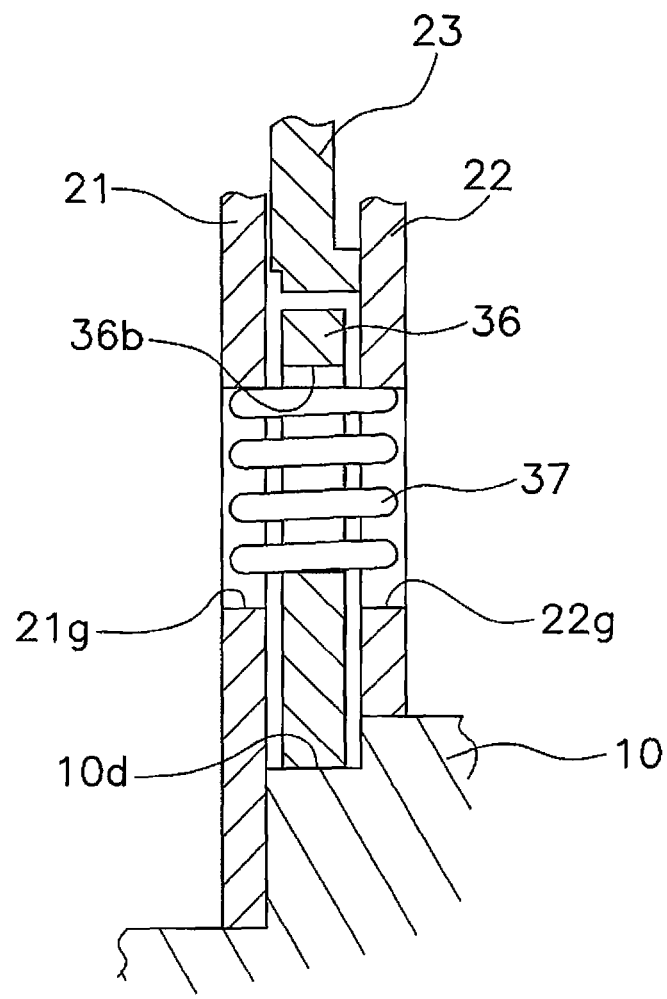
FIG. 13 is a partial cross-sectional view of the hysteresis torque generating mechanism.

As illustrated in FIG. 13, each spring 37 is accommodated in the opening 36b of each slider 36, while being held by its relevant pair of the spring-holding openings 21g and 22g of the first and second plates 21 and 22. One end of each spring 37a, disposed on the radially inside, is contacted to the inner peripheral end surface of the opening 36b of each slider 36, whereas the other end of each spring 37, disposed on the radially outside, is contacted to the outer peripheral end surfaces of the relevant pair of the spring-holding openings 21g and 22g of the first and second plates 21 and 22. While the lock-up device 6 is not being rotated (i.e., a centrifugal force is not acting on the device), each slider 36 is urged radially inward by each spring 37 without being contacted to the inner peripheral end surface of the hub flange 23.

First Torsion Springs 17

As illustrated in FIGS. 1 and 2, the plural first torsion springs 17 are members for elastically coupling a drive plate 40 and the first plate 21, which are fixed to the piston 15, in the rotational direction. An intermediate member 42 is disposed for covering the outer peripheral parts and the transmission-side lateral parts of the plural first torsion springs 17. The plural first torsion springs 17 are restricted from axially and radially moving by the piston 15 and the intermediate member 42.

Further, the intermediate member 42 is rotatable relative to the drive plate 40 and the first plate 21. Yet further, the intermediate member 42 is a member for causing each pair (i.e., two torsion springs) of the plural first torsion springs 17 to act in series.

Action

First, an action of the torque converter main body will be briefly explained.

During rotation of the front cover 2 and the impeller 3, the operating oil flows from the impeller 3 to the turbine 4, and power is transmitted from the impeller 3 to the turbine 4 through the operating oil. The power transmitted to the turbine 4 is transmitted to the input shaft (not illustrated in the drawings) of the transmission through the turbine hub 10.

When the rotational speed of the input shaft reaches a predetermined rotational speed, the lock-up device 6 is turned on, and power is mechanically transmitted from the front cover 2 to the 2 5 turbine hub 10 through the lock-up device 6. Specifically, the piston 15 is moved toward the engine by means of variation in hydraulic pressure, and the friction member 18 of the piston 15 is pressed onto the front cover 2. As a result, the piston 15 is unitarily rotated with the front cover 2, and power is transmitted from the front cover 2 to the turbine hub 10 through the piston 15, the first torsion springs 17 and the dynamic damper device 16.

Action of Dynamic Damper Device

In the dynamic damper device 16, the power inputted into the first and second plates 21 and 22 is transmitted to the turbine hub 10 through the driven plate 33. The hub flange 23 and the inertia member 24 are herein mounted to the first and second plates 21 and 22 through the second torsion springs 25. Therefore, variation in rotation of the engine can be effectively inhibited. In this regard, detailed explanation will be hereinafter made.

Figure 14:
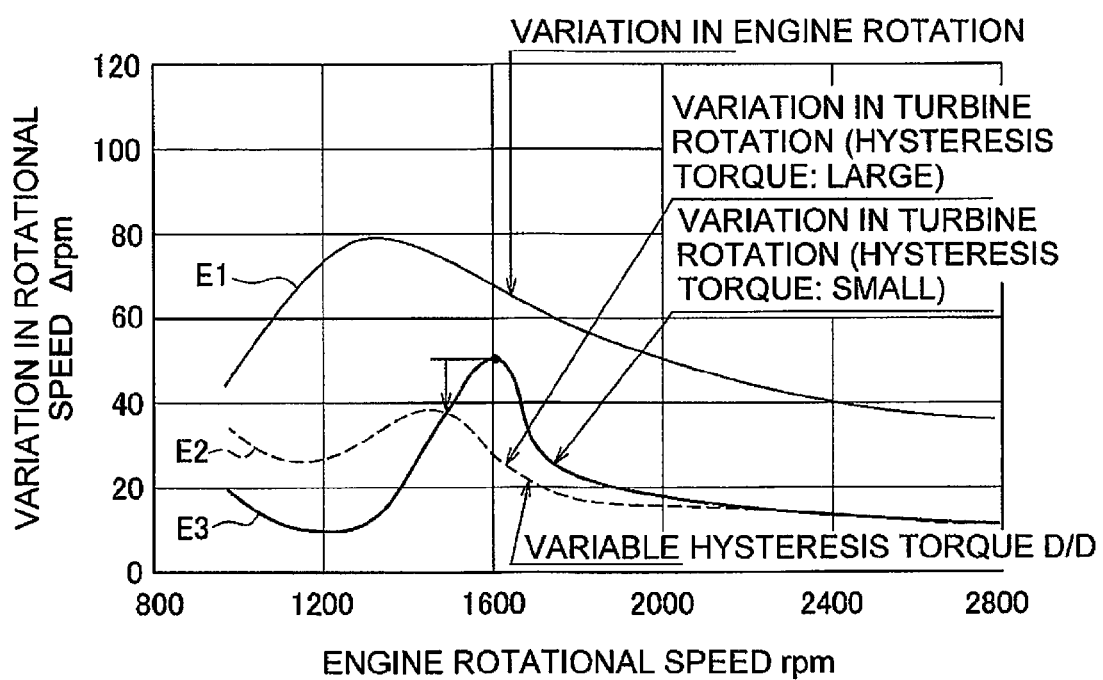
FIG. 14 is a characteristic diagram of engine rotational speed and variation in rotational speed.

As represented in FIG. 14, in general, when the rotational speed of an engine is reduced, variation in rotation of the engine to be caused by variation in combustion is increased (a characteristic E1). At this time, where the inertia member 24 (i.e., the dynamic damper device 16) is not provided, variation in speed of rotation to be outputted from a torque converter is gradually increased when the engine rotational speed is reduced. By contrast, where the dynamic damper device 16 is provided as with the present exemplary embodiment, it is possible to reduce variation in rotational speed of a turbine as an output-side component at around a specific engine rotational speed (around 1200 rpm in the example of FIG. 14) (characteristics E2 and E3).

A difference between the characteristics E2 and E3 in a low rotational speed range is attributed to the magnitude of a hysteresis torque in the hysteresis torque generating mechanism 26. The characteristic E2 relates to a case that a hysteresis torque is relatively large, whereas the characteristic E3 relates to a case that a hysteresis torque is relatively small. In the characteristic E2, variation in rotational speed of the turbine is reduced when the engine is rotated at around a rotational speed less than 1200 rpm, is then maximized at around 1500 rpm, and is gradually reduced in a rotational speed range greater than around 1500 rpm. In the characteristic E3, variation in rotational speed of the turbine indicates the minimum value less than that of the characteristic E2 around when the engine rotational speed exceeds 1200 rpm, and then, exceeds the characteristic E2 and indicates the maximum value when the engine rotational speed is around 1600 rpm.

As is obvious from these characteristics, variation in rotational speed of the turbine is smaller in a low engine rotational speed range when a hysteresis torque is smaller, whereas variation in rotational speed of the turbine is smaller in a middle engine rotational speed range when a hysteresis torque is larger. Variation in rotational speed of the turbine is less affected by the magnitude of a hysteresis torque in a high engine rotational speed range.

In view of the above, the hysteresis torque generating mechanism 26 according to the present exemplary embodiment is configured to change a hysteresis torque depending on rotational speed ranges. Specifically, a hysteresis torque to be generated by the hysteresis torque generating mechanism 26 becomes small in a low engine rotational speed range and becomes large in middle and high engine rotational speed ranges.

Action of Hysteresis Torque Generating Mechanism

Figure 15:
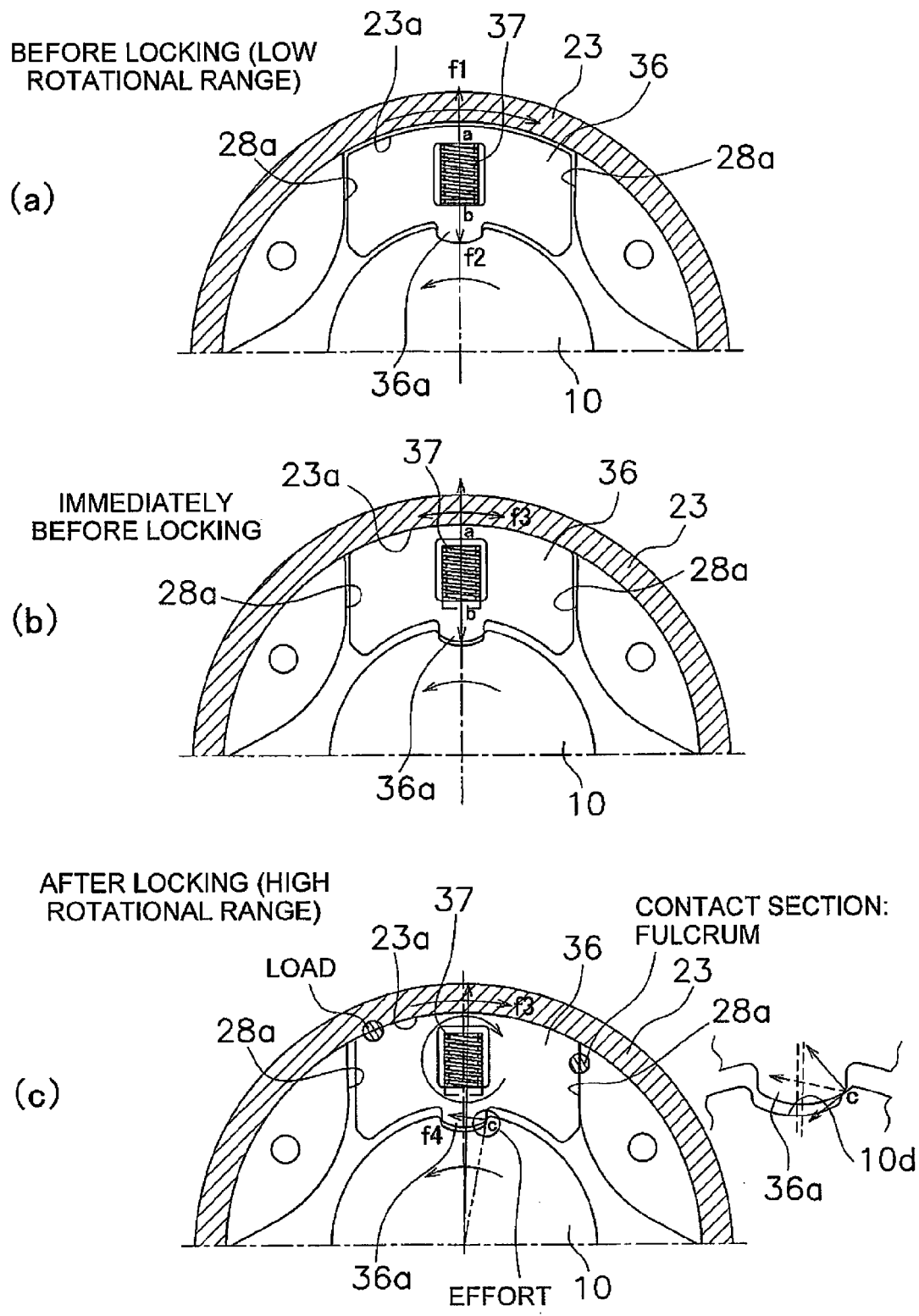
FIG. 15 is an actuation principle diagram for explaining an action of the hysteresis torque generating mechanism.

Using FIG. 15, explanation will be made for an action that a hysteresis torque varies depending on the rotational speed ranges.

First, in the low rotational speed range, a centrifugal force f1 acting on each slider 36 is relatively small. Therefore, as illustrated in FIG. 15(a), each slider 36 is urged radially inward by means of an urging force f2 of its relevant spring 37, while the outer peripheral surface of each slider 36 is not contacted to the inner peripheral end surface of the hub flange 23. Therefore, a hysteresis torque is relatively small. Only a hysteresis torque exists that is attributed to friction among respective components.

When the rotational speed is increased, the centrifugal force f1 acting on each slider 36 is increased. When such large centrifugal force f1 acts on each slider 36, each slider 36 is moved to the outer peripheral side against the urging force f2 of its relevant spring 37. Thus, as illustrated in FIG. 15(b), the outer peripheral surface of each slider 36 and the inner peripheral surface of the hub flange 23 are contacted to each other at around a point a. Therefore, at this time, a hysteresis torque greater than that in the low rotational speed range is generated.

Further, while variation in rotational speed is caused, the turbine hub 10 and the hub flange 23 are rotated in reverse phases. Therefore, each slider 36, contacted to the inner peripheral end surface of the hub flange 23, receives a force B, and accordingly, attempts to rotate in the clockwise direction in FIG. 15. Under such condition, as illustrated in FIG. 15(c), the support protrusion 36a of each slider 36 is contacted to the turbine hub 10 at a point c, and receives a force f4 from the contact point c. As described above, clearances are herein produced between the both lateral surfaces of each slider 36 and the contact parts 28a of each slider support portion 28. Accordingly, each slider 36 is supposed to further receive a clockwise moment. As a result, one lateral surface of each slider 36 is supposed to be strongly pressed onto its relevant contact part 28a, and serves as a fulcrum. Further, in the drawing, a position in the vicinity of the left side of each slider 36 serves as a load. Thus, each slider 36 is further strongly pressed onto the inner peripheral surface of the hub flange 23 by the principle of lever.

As described above, a hysteresis torque, which is greater than that to be generated in the conditions illustrated in FIGS. 15(a) and 15(b), is generated between components rotated relative to each other, i.e., between the hub flange 23 and a component group including the first and second plates 21 and 22 and the turbine hub 10.

With the aforementioned structure, as represented in FIG. 14, the characteristic of variation in rotational speed of the turbine becomes the characteristic E3 in the low rotational speed range, and becomes the characteristic E2 in the middle to high rotational speed ranges. Therefore, variation in rotational speed of the turbine can be suppressed low in the entire engine rotational speed ranges.

Features

A small hysteresis torque is generated in the low rotational speed range, whereas a large hysteresis torque is generated in the middle to high rotational speed ranges. Therefore, variation in rotational speed of the turbine can be inhibited in a wide rotational speed range.

The hysteresis torque generating mechanism 26 is disposed between the first plate 21 and the second plate 22. Therefore, the device can be formed with a compact size in the axial direction.

A hysteresis torque is caused to vary using the centrifugal force acting on the sliders 36. Therefore, with a simple structure, different hysteresis torques can be generated depending on the rotational speed ranges.

Each slider 36 is caused to pivot about the support protrusion 36a to be contacted onto the contact part 28a of the second plate 22, and thereby, the contact position serves as a fulcrum. Thus, each slider 36 is configured to be further strongly pressed onto the inner peripheral surface of the hub flange 23 by the principle of lever. Therefore, a large hysteresis torque can be generated with a simple structure.

Other Exemplary Embodiments

The present invention is not limited to the exemplary embodiment as described above, and a variety of changes or modifications can be made without departing from the scope of the present invention.

The structure of the hysteresis torque generating mechanism is not limited to that described in the aforementioned exemplary embodiment. Any structure can be applied as long as a hysteresis torque to be generated varies depending on rotational speed ranges.

The aforementioned exemplary embodiment has been explained by exemplifying the torque converter as a fluid type power transmission device. However, a fluid coupling without a stator may be applied as a fluid type power transmission device.

Figure 16:
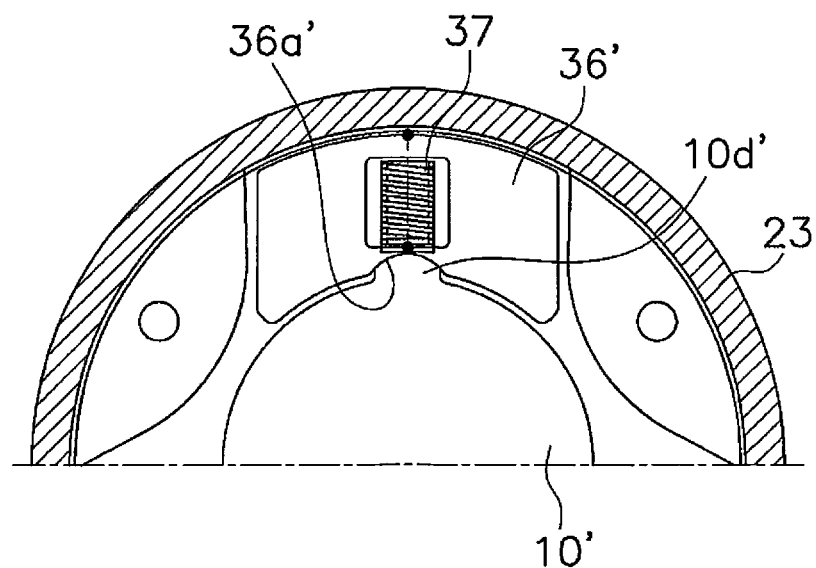
FIG. 16 is a diagram corresponding to FIG. 12 and illustrates another exemplary embodiment of the hysteresis torque generating mechanism.
Figure 17:
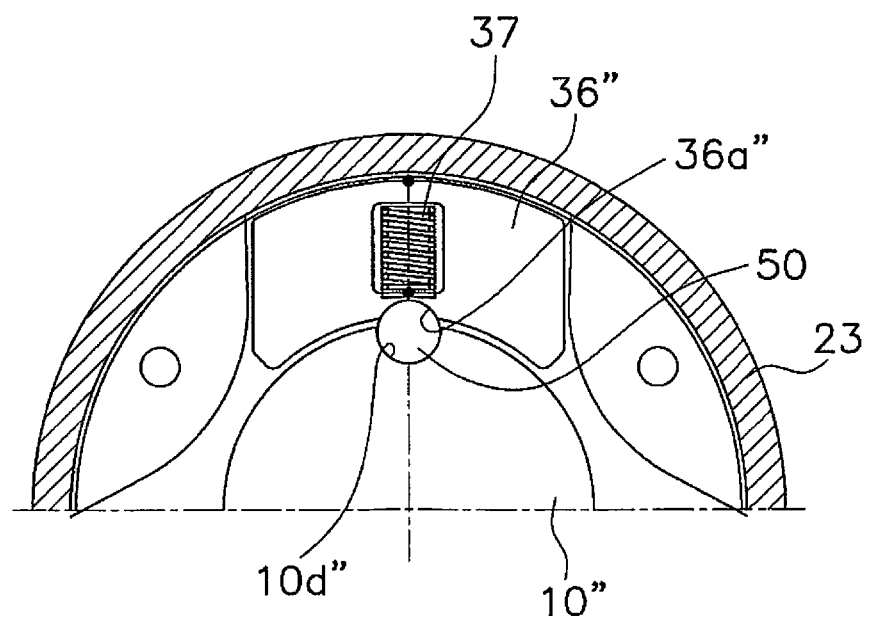
FIG. 17 is a diagram corresponding to FIG. 12 and illustrates yet another exemplary embodiment of the hysteresis torque generating mechanism.

FIGS. 16 and 17 illustrate other exemplary embodiments of a pressing mechanism for generating a large hysteresis torque by causing sliders to pivot.

In the exemplary embodiment illustrated in FIG. 16, each of sliders 36' has a support recess 36a' instead of the support protrusion 36a provided in the aforementioned exemplary embodiment. The support recess 36a' has a surface convexly curved to the outer peripheral side in a circular-arc shape. A turbine hub 10' has support protrusions 10d', each of which is fitted into each support recess 36a'. The tip end surface of each support protrusion 10d' is formed in a circular-arc shape along the circular-arc surface of each support recess 36a'.

Further, in the exemplary embodiment illustrated in FIG. 17, each of sliders 36" has a support recess 36" basically structured similarly to the corresponding element illustrated in FIG. 16. A turbine hub 10" has support recesses 10d" respectively recessed to the inner peripheral side in a circular-arc shape. Further, each of rollers 50 is fitted into each pair of these support recesses 36a" and 10d".

The aforementioned exemplary embodiments illustrated in FIGS. 16 and 17 can also achieve advantageous effects similar to those achieved by the aforementioned exemplary embodiment.

With employment of a dynamic damper device of the present invention, a lock-up device is enabled to set the lock-up rotational speed as low as possible, and in addition, to inhibit variation in turbine rotation in a wide rotational speed range. Thus, low fuel consumption can be implemented. Further, it is possible to implement a mechanism for generating a variable hysteresis torque with a simple structure without increasing the axial size of the lock-up device.

The invention claimed is:

1. A dynamic damper device disposed between a piston of a lock-up device and a turbine hub of a fluid type power transmission device, comprising:
   a pair of plates into which a torque is inputted from the piston, the pair of plates being configured to be coupled to the turbine hub;
   an annular hub flange disposed between the pair of plates while being rotatable relative to the pair of plates;
   an inertia member fixed to the hub flange;
   an elastic member elastically coupling the pair of plates and the hub flange in a rotational direction; and
   a hysteresis torque generating mechanism disposed on an inner peripheral side of the hub flange while being disposed between the pair of plates in an axial direction, the hysteresis torque generating mechanism being configured to generate a variable hysteresis torque between the pair of plates and the hub flange,
   wherein the hysteresis torque generating mechanism is configured to generate a first hysteresis torque in a low rotational speed range and generate a second hysteresis torque greater than the first hysteresis torque in middle to high rotational speed ranges.

2. The dynamic damper device recited in claim 1, wherein the hysteresis torque generating mechanism includes a plurality of sliders configured to be rotated together with the pair of plates and be movable in a radial direction, and the plurality of sliders are configured to be moved radially outward by means of a centrifugal force so as to be contacted to an inner peripheral surface of the hub flange when the pair of plates is rotated at a predetermined rotational speed or greater.

3. The dynamic damper device recited in claim 2, wherein the hysteresis torque generating mechanism further includes a pressing mechanism configured to press the plurality of sliders onto at least one of the pair of plates, the hysteresis torque generating mechanism being configured to press each of the sliders onto the inner peripheral surface of the hub flange by an action using a lever principle where the part of each slider pressed onto one of the pair of plates by the pressing mechanism serves as a fulcrum.

4. The dynamic damper device recited in claim 3, wherein the pressing mechanism includes
   a contact part being formed on at least one of the pair of plates, the contact part being spaced from a rotation-directional lateral surface of each of the sliders by a clearance; and
   a support part supporting each of the sliders to make each of the sliders pivotable with respect to the turbine in the rotational direction.

5. The lock-up device for the fluid type power transmission device, the lock-up device being configured to mechanically transmit a power from a front cover to the turbine hub of the fluid type power transmission device, the lock-up device comprising:
   the piston being configured to be pressed onto the front cover;
   the dynamic damper device recited in claim 4; and
   an elastic member elastically coupling the piston and the dynamic damper device in therotational direction.

6. The lock-up device for the fluid type power transmission device, the lock-up device being configured to mechanically transmit a power from a front cover to the turbine hub of the fluid type power transmission device, the lock-up device comprising:
   the piston being configured to be pressed onto the front cover;
   the dynamic damper device recited in claim 1; and
   an elastic member elastically coupling the piston and the dynamic damper device in the rotational direction.

* * * * *